3,502,668
2-PHENYL-5-TERTIARYAMINO ALKYL-1,3,4-OXADIAZOLES

Giuseppe Palazzo and Bruno Silvestrini, Rome, Italy, assignors to Angelini Francesco-Aziende Chimiche Riunite S.N.C., Rome, Italy, a company
No Drawing. Filed July 26, 1966, Ser. No. 567,825
Claims priority, application Italy, Mar. 2, 1966, 15,087/66
Int. Cl. C07d 87/38, 87/40
U.S. Cl. 260—247.5            5 Claims

ABSTRACT OF THE DISCLOSURE 1,3,4-oxadiazoles having an aryl, alkaryl, alkoxyaryl or haloaryl substituent in the 2 position and a disubstituted aminoalkyl group at the 5 position and their non-toxic acid addition salts are disclosed. These compounds have anti-inflammatory activity, analgesic properties and low toxicity.

---

This invention relates to 1,3,4-oxadiazoles and processes for their preparation.

In U.S. patent specification No. 3,141,019 there are disclosed certain therapeutically active 1,2,4-oxadiazoles and methods for their preparation. In accordance with the present invention a group of novel 1,3,4-oxadiazoles have been discovered having improved properties over the 1,2,4-oxadiazoles mentioned above.

The 1,3,4-oxadiazoles of this invention are of the formula:

(1) 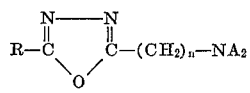

wherein:

R is a radical selected from the group consisting of aryl, alkaryl, alkoxyaryl and haloaryl, said alkyl and alkoxy substituents containing from 1–4 carbon atoms;

A is an alkyl radical, with the proviso that both A radicals may be joined together to form an alkylene chain forming a cyclic group with the nitrogen atom, which chain may be interrupted by a hetero group selected from the group consisting of oxygen atoms and amino groups of the formula >NR'', where R'' is selected from the group consisting of hydrogen, alkyl and aryl; and $n$ is an integer of from 1–4 inclusive.

The compounds of Formula I may be prepared by a variety of different methods. In accordance with the first method of this invention the compounds of Formula I are prepared by the reaction of a secondary amine of the formula HNA$_2$ with a 2-aryl-5-$\omega$-haloalkyl-1,3,4-oxadiazole of the formula:

(II) 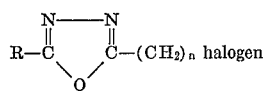

where R, A and $n$ are as above defined.

This reaction may be performed by reacting one equivalent of the compound of Formula II with two equivalents of the amine in an organic solvent, preferably tetrahydrofuran or dioxan, at a temperature of from room temperature up to 120° C. Other solvents which may alternatively be used include hydrocarbons, ethers, esters, alcohols and chlorinated compounds.

In accordance with the second method of this invention the compounds of Formula I are prepared by direct condensation of an aroylhydrazine of the formula RCONHNH$_2$ with an iminoether hydrohalide, preferably the hydrochloride, of the formula:

(III) 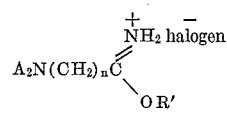

where R, A and $n$ are as defined above and R' represents an alkyl group containing from 1–4 carbon atoms.

In accordance with the third method of this invention the compounds of Formula I are prepared by the condensation of an iminoether hydrohalide, preferably the hydrochloride, of the formula:

(IV) 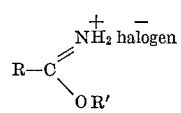

with a dialkylaminoacylhydrazine of the formula

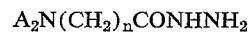

wherein such formulae A, R and $n$ are as defined above and R' represents an alkyl group containing from 1–4 carbon atoms.

These latter two methods may conveniently be performed by heating the reactants together in an organic solvent for about an hour until the condensation is complete. Suitable organic solvents include alcohols, dioxane, pyridine, and N-methylpyrrolidinone.

For therapeutic and pharmacological purposes the compounds of Formula I are usually used in the form of their acid addition salts, which salts are also within the scope of this invention. Generally the compounds will be used in the form of their hydrochloride salts. However, many other salts are suitable such as salts with other inorganic acids, including sulphates, phosphates and so on, salts with aliphatic mono and polycarboxylic acids, such as formates, acetates, lactates, succinates, malonates, glutarates, adipates, tartrates, citrates, maleates, fumarates and so on, salts with aromatic acids, such as benzoates, salicylates, pamoates and so on, salts with sulphonic acids, such as with p-toluenesulphonic acid, and salts with sulphamic acids, such as with ciclamic acid.

From a pharmacological point of view the main properties of the compounds of this invention can be summarised as follows.

(1) ACUTE TOXICITY

The LD$_{50}$ for oral administration for all the compounds exceeds 1000 mg./kg. both on mice and rats. The lethal doses in case of introperitoneal administration vary according to the particular compound concerned; however for many compounds the lethal dose on mice is from 600 to 1000 mg./kg. The effects on the behaviour are generally characterised by a low sedative degree that appears at dosages of 100 mg./kg. or more.

With sublethal doses prostrations and spasm are observed. However, no neurovegetative effects or more particular effects, as the Straub tail, which could be ascribed to a central action like that of the analgetic narcotics can be ascertained.

In general a good tolerability has been shown.

(2) ANTI-INFLAMMATORY EFFECTS

All the compounds of the invention show an anti-inflammatory action in the carrageenin tests (Winter and other). Such activity is strongest with the 2 para-chlorophenyl-5-diethylaminopropyl-1,3,4 - oxadizole and with the 2-p-methoxyphenyl-5-diethylaminopropyl-1,3,4 - oxadiazole.

The anti-inflammatory properties are further confirmed by the results obtained by examining the coagulation of albumin under heat (Mizushima). Particularly active are 2-phenyl-5-diethylaminomethyl-1,3,4-oxadiazole; 2-phenyl-pyrrolidino-methyl-1,3,4-ozadiazole; 2 - phenyl-5-morpholinomethyl-1,3,4-oxadiazole; 2 - p-chlorophenyl-5-diethylaminomethyl-1,3,4-oxadiazole; and 2-p-chlorophenyl-5-pyrrolidinomethyl-1,3,4-oxadiazole.

From a quantitative point of view the anti-inflammatory activity is comparable to that of acetylsalicylic acid.

For a correct interpretation of the results, reference should be made to the Mizushima conclusions, who affirms that the capacity of stabilising albumin represents an intrinsic property of antirheumatic drugs.

(3) ANALGESIC EFFECTS

Many compounds of the invention have an analgesic effect comparable with or better than that of acetylsalicyclic acid. For instance, 2-p-methoxyphenyl-5-diethylaminopropyl-1,3,4-oxadiazole is twice as active and 2-p-chlorophenyl-5-diethylaminopropyl - 1,3,4 - oxadiazole is five times as active.

The tests have been effected according to Randall and Selitto and according to Siegmund et al. No effects have been ascertained in the tests of Woolfe—MacDonald and of Bianchi—Franceschini, at least at doses which do not affect in any significant manner the general reactivity of the animal. It can be said that this action is of peripherical type for the following reasons. Before all the ability of selectively inhibiting the inflammatory pain (test of Randall, Selitto and of Siegmund et al.) is an elective property of the non-narcotic analgesics of the acetylsalicylic acid type (Crepax and Silvestrini). Secondly the control of the behaviour has not shown any of those effects characterising the central analgesics. Further these compounds possess an activity also in respect of the experimental inflammation produced by carrageenin.

(4) ANTIPYRETIC EFFECT

All the compounds of the invention show an antipyretic effect on rates using the method of Smith and Hamburger. The effective doses vary according to the particular compound employed. Generally speaking the 2-p-chlorophenyl-5-morpholinomethyl-1,3,4 - oxadiazole, 2-p-methoxyphenyl-5-diethylaminopropyl - 1,3,4-oxadiazole, and 2-p-chlorophenyl-5-diethylaminopropyl-1,3,4 - oxadiazole are more active than acetylsalicylic acid; the activity of the other products is the same or slightly smaller.

Compared with the 1,2,4-oxadiazoles disclosed in the U.S. Patent referred to above the 1,3,4-oxadiazole compounds of this invention show a number of well defined advantages. Firstly, the toxicity of the present compounds is remarkably lower from the point of view of acute toxicity as well as of the general effects on the behaviour. Secondly an improvement of the analgesic properties is noted, which properties are also modified from a qualitative point of view. Thirdly, unlike the previous compounds, the compounds of this invention show a remarkable effect in the phenylquinone test, which according to many researchers, demonstrate the analgesic effect at visceral level. The importance of this effect indicates that some of these compounds may have important practical applications. Further a certain effect in the test of albumin coagulation is noted where the 1,2,4-oxadiazoles compounds are inactive. This result suggests a possible application to arthritic and rheumatic diseases.

Also included within the scope of this invention are methods for the preparation of the intermediate compounds of Formula II. These 2-aryl-5-ω-haloalkyl-1,3,4-oxadiazoles may be prepared by two alternative methods. Firstly, they may be prepared by dehydration and subsequent cyclization of an N-aroyl-N'-haloacylhydrazine of the formula:

(V)    R—CONHNHCO(CH$_2$)$_n$ halogen where R and $n$ are as above defined.

This dehydration and cyclization may be effected by treating the compound of Formula V with a dehydrating agent such as concentrated sulphuric acid, phosphoric anhydride, zinc chloride, aluminum chloride, phosphorus pentachloride, dicyclohexylcarbodiimide. The reaction may be performed in the presence or absence of a solvent as may be desired. Preferably the dehydration and cyclization is preferred by heating the compound of Formula V under reflux with an excess of phosphorus oxychloride.

Alternatively, the intermediate compounds of Formula II may be prepared by reacting an aroylhydrazine of the formula RCONHNH$_2$ with an iminoether hydrohalide, preferably the hydrochloride, of the formula:

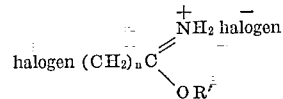

where, in such formulae, R, R' and $n$ are as defined above. This reaction may be performed by heating the reactants in an organic solvent, such as an alcohol, dioxan, pyridine or N-methylpyrrolidinone, for about one hour until the reaction is complete.

The invention is illustrated by the following examples.

Example I.—2-p-chlorophenyl-5-chloromethyl-1,3,4-oxadiazole (a) 18 g. of N - chloroacetyl-N-p-chlorobenzoyl-hydrazine and 50 ml. of phosphorus oxychloride are heated under reflux for about two hours.

The excess of the reagents is withdrawn under reduced pressure and to the residue ice-water is added.

After filtration and crystallization from a small amount of alcohol, there is obtained 2-p-chlorophenyl-5-chloromethyl-1,3,4-oxadiazole in a yield of 60% (melting point 85° C.).

Analysis.—Calculated for C$_9$H$_6$Cl$_2$N$_2$O (percent): C, 47.19; H, 2.64; N, 12.23. Found (percent): C, 47.33; H, 2.80; N, 12.12.

(b) 4 g. of ethyl chloroacetimidate hydrochloride and 4 g. of benzoylhydrazine are boiled for an hour with 40 ml. of absolute alcohol.

After cooling and diluting with water raw 2-p-chlorophenyl-5-chloromethyl-1,3,4-oxadiazole precipitates which is purified by crystallization from alcohol. Yield 90%.

Example II.—2-phenyl-5-diethylaminomethyl-1,3,4-oxadiazole hydrochloride

One equivalent of 2-phenyl-5-chloromethyl-1,3,4-oxadiazole is dissolved in an hydrous dioxan to obtain approximately a 15% solution. Two equivalents of diethylamine are added and the solution is maintained at room temperature for six days. After this period the reaction is complete and this is indicated by the fact that no further precipitate of diethylamine hydrochloride is formed, and that diethylamine hydrochloride has been obtained in theorical yield.

The filtered solution is evaporated to dryness at reduced pressure and the reaction product is converted into the hydrochloride salt with the calculated amount of hydrochloric acid in ether. The hydrochloride is re-crystallized from dioxan and has a melting point of 165° C.

Analysis.—Calculated for C$_{13}$H$_{18}$Cl$_1$N$_3$O (percent): C, 58.31; H, 6.78; N, 15.70; Cl ion, 13.25. Found (percent): C, 58.06; H, 7.05; N, 15.59; Cl ion, 13.19.

Example III.—2-phenyl-5-γ-morpholinopropyl-1,3,4-oxadiazole hydrochloride

One equivalent of 2-phenyl-5-γ-chloropropyl-1,3,4-oxadiazole and two equivalents of morpholine are dissolved in dioxan. The solution is heated in a sealed tube at 115° C. for 50 hours. After cooling the solution of morpholine hydrochloride is filtered and concentrated at reduced pressure.

To the residue ether is added and the reaction product is precipitated as hydrochloride with the calculated amount of hydrochloric acid in ether.

Crystallization is effected from absolute alcohol. Melting point 60° C.

*Analysis.*—Calculated for $C_{15}H_{20}ClN_3O_2$ (percent): Cl ion, 11.45. Found (percent): Cl ion, 11.47.

Example IV.—2-phenyl-5-δ-dimethylaminobutyl-1,3,4-oxadiazole hydrochloride

Methyl-γ-dimethylaminopropylmalonate is first prepared by reacting one equivalent of 1-chloro-3-dimethylaminopropane with one equivalent of the sodium salt of methylmalonate in solution in absolute methylalcohol. The reaction is completed after six hours and the product is isolated by distillation at reduced pressure. The product boils at 120° C. under 1 mm./Hg. The product is subsequently boiled for two hours with a 20% solution of NaOH. The solution is acidified with concentrated hydrochloric acid and heated under reflux for ten hours. In this way δ-dimethylaminovalerianic acid is obtained; the acid is not separated but immediately esterified to the methyl ester.

For this purpose the reaction mixture is concentrated at reduced pressure, and methyl alcohol is added together with a small amount of concentrated $H_2SO_4$. The resulting mixture is heated under reflux whilst removing the water formed during the reaction by means of magnesuim sulfate in a Soxhlet extractor. The solvent is subsequently removed, and the substance obtained is neutralised and extracted with ether. The methyl ester of the δ-dimethylaminovalerianic acid is purified by distillation at reduced pressure. Boiling point 110° C. at 20 mm./Hg.

A mixture of equal parts of this ester and 98% hydrazine hydrate is heated under reflux for about two hours till a single phase is obtained. The hydrazine of the δ-dimethylaminovalerianic acid is separated by distillation under reduced pressure. Boiling point 142° C. at 0.5 mm./Hg.

3 g. of this hydrazine, 3 g. of benziminoether hydrochloride, 4 ml. of a 5N alcholic solution of hydrochloric acid and 20 ml. of anhydrous ethanol are heated under reflux for one hour. The solvent is removed and after neutralisation the basic portion is extracted with ether. The portion is subsequently transformed in hydrochloride with a solution of hydrochloric acid in ether. After crystallisation from absolute alcohol the product has a melting point of 205° C.

*Analysis.*—Calculated for $C_{14}H_{19}ClN_3O$ (percent): C, 59.67; H, 7.16; N, 14.91; Cl, 12.58. Found (percent): C, 59.66; H, 7.26; N, 14.87; Cl, 12.63.

Example V.—2-phenyl-5-dimethylaminoethyl-1,3,4-oxidiazole hydrochloride 2 g. of β-dimethylaminopropionitrile are added dropwise under continuous stirring and cooling to a solution of 35 ml. of methanol saturated with hydrochloric acid. Stirring is continued for half an hour at 0° C., the solution is diluted with anhydrous ether and the methyl β-dimethylamino-propionimidate is filtered. Melting point 100° C.

2.4 g. of this product and 1.36 g. of benzoylhydrazine are boiled for an hour in 25 ml. of anhydrous ethanol. The solution is hot filtered and evaporated till dryness.

The residue is converted into the hydrochloride by means of ethereal hydrochloric acid. The product is obtained by crystallisation from absolute alcohol. The 2-phenyl-5-dimethylaminoethyl-1,3,4-oxadiazole hydrochloride obtained has a melting point of 190–192° C.

Following similar procedures the intermediate compounds listed below in Table I may be prepared and also the final products listed below in Table II.

TABLE I

| Intermediate: | M.P., ° C. |
|---|---|
| 2-phenyl-5-chloroethyl-1,3,4-oxadiazole | 68 |
| 2-phenyl-5-chloropropyl-1,3,4-oxadiazole | 70 |
| 2 - p-chlorophenyl-5-chloropropyl-1,3,4-oxadiazole | 76 |
| 2-p-methoxyphenyl-5-chloromethyl-1,3,4-oxadiazole | 95–97 |
| 2 - o-chlorophenyl-5-chloromethyl-1,3,4-oxadiazole | 97 |
| 2-m-methylphenyl-5-chloromethyl-1,3,4-oxadiazole | 70 |

TABLE II

| Compound: | M.P., ° C. (of hydrochloride salt) |
|---|---|
| 2-phenyl - 5-pyrrolidinomethyl-1,3,4-oxadiazole | 209–2211 |
| 2 - phenyl-5-morpholinomethyl-1,3,4-oxadiazole | 235 |
| 2 - phenyl-5-diethylaminoethyl-1,3,4-oxadiazole | 159 |
| 2 - phenyl - 5-pyrrolidinoethyl-1,3,4-oxadiazole | 185 |
| 2 - phenyl-5-diethylaminopropyl-1,3,4-oxadiazole | 146–148 |
| 2-phenyl-5-dimethylaminopropyl-1,3,4-oxadiazole | 185 |
| 2 - p - chlorophenyl-5-diethylaminomethyl-1,3,4-oxadiazole | 179–181 |
| 2 - p - chlorophenyl-5-morpholinomethyl-1,3,4-oxadiazole | 245 |
| 2 - p - chlorophenyl-5-pyrrolidinomethyl-1,3,4-oxadiazole | 221–223 |
| 2 - p - chlorophenyl-5-diethylaminopropyl-1,3,4-oxadiazole | 197 |
| 2 - p-methoxyphenyl-5-diethylaminomethyl-1,3,4-oxadiazole | 136–138 |
| 2 - p - methoxyphenyl-5-morpholinomethyl-1,3,4-oxadiazole | 209–211 |
| 2 - p - methoxyphenyl-5-pyrrolidinomethyl-1,3,4-oxadiazole | 207–209 |
| 2 - p-methoxyphenyl-5-diethylaminopropyl-1,3,4-oxadiazole | 100 |
| 2-phenyl-5-piperidinoethyl-1,3,4-oxadiazole | 203 |
| 2 - phenyl - 5 - N'-methylpiperazinoethyl-1,3,4-oxadiazole | 213 |
| 2 - o-chlorophenyl-5-diethylaminoethyl-1,3,4-oxadiazole | 170 |
| 2 - o - chlorophenyl-5-N'-phenylpiperazinomethyl-1,3,4-oxadiazole | 211–212 |
| 2 - m - methylphenyl-5-diethylaminomethyl-1,3,4-oxadiazole | 138 |

We claim:
1. 1,3,4-oxadiazole of the formula

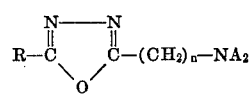

wherein:

R is a radical selected from the group consisting of phenyl, alkylphenyl, alkoxyphenyl and chlorophenyl, said alkyl and alkoxy substituents being of from 1–4 carbon atoms;

$NA_2$ is selected from the group consisting of dialkyl amino wherein the alkyl group is of 1 to 2 carbon atoms, pyrrolidino, morpholino, piperidino, N'-methylpiperazino and N'-phenylpiperazino and *n* is an integer from 1–4 inclusive, or acid addition salts thereof.

2. 2 - phenyl - 5-morpholinomethyl-1,3,4-oxadiazole or non-toxic acid addition salts thereof.

3. 2 - phenyl - 5β pyrrolidinoethyl-1,3,4-oxadiazole or non-toxic acid addition salts thereof.

4. 2 - p - chlorophenyl - 5-diethylaminomethyl-1,3,4-oxadiazole or non-toxic acid addition salts thereof.

5. 2 - p - chlorophenyl - 5γ diethylaminopropyl-1,3,4-oxadiazole or non-toxic acid addition salts thereof.

References Cited

Barron: Chemical Abstracts, vol. 60, p. 16,406 (1964).

ALEX MAZEL, Primary Examiner

J. TOVAR, Assistant Examiner

U.S. Cl. X.R.

260—268, 307; 424—248, 250, 272